US011551231B2

(12) United States Patent
Warren, Jr. et al.

(10) Patent No.: US 11,551,231 B2
(45) Date of Patent: Jan. 10, 2023

(54) SYSTEM FOR DETECTION OF MONEY LAUNDERING

(71) Applicants: Robert L. Warren, Jr., Bowie, MD (US); Michael D. Clanton, II, Laurel, MD (US); Anthony Reason, Alexandria, VA (US)

(72) Inventors: Robert L. Warren, Jr., Bowie, MD (US); Michael D. Clanton, II, Laurel, MD (US); Anthony Reason, Alexandria, VA (US)

( * ) Notice: Subject to any disclaimer, the term of this patent is extended or adjusted under 35 U.S.C. 154(b) by 7 days.

(21) Appl. No.: 17/370,396

(22) Filed: Jul. 8, 2021

(65) Prior Publication Data

US 2022/0036362 A1 Feb. 3, 2022

Related U.S. Application Data

(60) Provisional application No. 63/049,412, filed on Jul. 8, 2020.

(51) Int. Cl.

| G07F 17/32 | (2006.01) |
| G06Q 20/40 | (2012.01) |
| G06Q 50/34 | (2012.01) |
| G06Q 30/00 | (2012.01) |
| G06V 40/16 | (2022.01) |

(52) U.S. Cl.
CPC ..... *G06Q 20/4016* (2013.01); *G06Q 30/0185* (2013.01); *G06Q 50/34* (2013.01); *G06V 40/172* (2022.01); *G07F 17/3241* (2013.01)

(58) Field of Classification Search
USPC ................................................ 705/44, 1.1
See application file for complete search history.

(56) References Cited

U.S. PATENT DOCUMENTS

| 2005/0137016 | A1* | 6/2005 | Enzminger | ......... G07F 17/3239 463/42 |
| 2017/0309121 | A1 | 10/2017 | Chun et al. | |

* cited by examiner

*Primary Examiner* — William E Rankins
(74) *Attorney, Agent, or Firm* — Royal W. Craig; Gordon Feinblatt LLC

(57) ABSTRACT

A system for the detection of money laundering activities involving casino slot machines and Video Lottery Terminals (collectively "VLTs/Slot Machines") using flash memory cards inserted individually at each participating VLT/Slot Machine. The flash memory deploys individual copies of security software that monitors cash in/plays/and cash out on all connected VLTs/Slot Machines. The security software contains an artificial intelligence module that flags "suspicious activity" at all connected VLTs/Slot Machines and keeps an audit trail. The security software will disable/track TITO serial numbers/barcodes of all TITOs printed from VLTs in "silent alarm mode". TITO serial numbers/barcodes printed in "alarm mode" need to be redeemed at the cashier's cage and will not work in an automated redemption kiosk or Ticket Redemption Unit, and the cashiers are forewarned to require positive identification and complete a Suspicious Activity Report (SARC).

13 Claims, 2 Drawing Sheets

SYSTEM FOR DETECTION OF MONEY LAUNDERING

CROSS-REFERENCE TO RELATED APPLICATION(S)

The present application derives priority from U.S. provisional application Ser. No. 63/049,412 filed 8 Jul. 2020.

BACKGROUND a. Field of Invention

The invention relates to the detection of money laundering activities in casino networks. More particularly, the present disclosure relates automated money laundering detection, notification, and reporting techniques implemented in slot machines by casino gaming networks.

b. Background of the Invention

Casinos and card clubs are prone to illicit money laundering activities. In the US, licensed gaming establishments with gross annual gaming revenue greater than $1 M are subject to the Bank Secrecy Act at 31 USC 5311 et seq, and held to FinCEN's (Financial Crimes Enforcement Network) anti-money laundering regulations under at 31 CFR § 1021 et seq. 31 CFR § 1021.320 requires many casinos and card Currency clubs to report suspicious transactions conducted or attempted by, at or through the gaming establishment. Such casinos and card clubs may thus be required to report suspicious transactions on FinCEN Form 102, the Suspicious Activity Report by Casinos and Card Clubs (herein referred to as "SARC"). Casinos subject to FinCEN regulations may also be required to submit Transaction Report by Casinos (CTRC) filings on cash transactions exceeding $10,000. Compliance with FinCEN's regulations is overseen by the Internal Revenue Service (IRS) and deficiencies often result in significant civil penalties and sanctions.

Inside the casinos, transactions take place at the "cashier's cage" or casino bank, at the table games where customers can buy chips/tokens directly, at automated redemption kiosks where customers can redeem "Ticket in Ticket Out" vouchers (TITO), and at slot machines. Existing anti-money laundering programs typically enlist the help of floor managers and slots managers for detecting and reporting suspicious transactions and for assisting with the identification and reporting of suspicious transactions. This is easier with floor games where managers interface directly with the customers. It is much more difficult for slots managers where a single person may be responsible for thousands of slot machines and monitoring is via cameras.

In slot machines specifically, FinCEN has stated that "when a casino has knowledge of customer paper money transactions for slot club accountholders identified through its slot monitoring system, it must aggregate these with other types of "cash in" transactions of which the casino has knowledge and which are recorded on a casino's books and records to determine whether the currency transactions exceed $10,000 for a customer in a gaming day. When a casino has knowledge of multiple currency transactions conducted by or on behalf of the same customer on the same day, it is required to treat those multiple transactions as a single reportable transaction for purposes of determining whether currency transaction reporting requirements have been met. This implies that casinos must aggregate transactions not just involving insertion of bills into slot machines, but also other categories of transactions such as TITO voucher redemptions. If a criminal wants to launder money utilizing slot machines, they will typically visit numerous slot machines over a short time period, insert substantial cash at each, play for a brief time and cash out. They ultimately hold a handful of TITO vouchers which can be taken to an automated redemption kiosk to convert to laundered cash. This is extremely difficult to monitor. There have been efforts to automate the monitoring. For example, United States Patent Application 20170309121 by Chun et al. published Oct. 26, 2017 shows an automated money laundering detection, notification, and reporting process for casino gaming networks that analyzes financial transactions using a cash or credit voucher occurring at casino establishments to determine if they are classifiable as suspect money laundering activity. If so, the system begins to track the real-time location of the cash or credit voucher in the casino over a subsequent time interval. The problem with this is that credit vouchers are valid for at least thirty (30) days from receipt, and the launderer will typically leave and return twenty-nine days later for the cash. In some gaming jurisdictions this redemption timeframe can be as long as one hundred and eighty days (180). The casino cannot track the credit voucher to a launderer's home, and upon return all video footage (which is typically archived after a fifteen-day interval depending on the gaming jurisdiction) has been deleted. If no actual human/individual is present to observe the activity and deem it suspicious then the likelihood of the activity either not being discovered or being discovered too late increases. Moreover, "unaudited/unrequested" camera footage in a casino is usually only archived for fifteen days. If a surveillance officer has no real-time suspicion and fails to immediately observe an individual who is suspected of suspicious activity, the ability of the surveillance department to identify that individual becomes more difficult with each passing day.

What is needed is a system for the detection of money laundering activities involving casino slot machines.

SUMMARY OF THE INVENTION

An object of this invention is therefore to overcome the foregoing inconveniences by providing a system for the detection of money laundering activities involving casino slot machines and Video Lottery Terminals (collectively "VLTs/Slot Machines"). The present system is deployed by "flash memory" cards inserted individually at each participating VLT/Slot Machine. The flash memory deploys individual copies of security software that monitors cash in/plays/and cash out on all connected VLTs/Slot Machines. The security software contains an artificial intelligence module that correlates an individual's transactions, monitors critical parameters of their play using a declining/accumulating point system with critical-point thresholds, and auto-initiates a silent "alarm mode" when certain such thresholds are exceeded (silent alarm mode herein being defined as an alarm state that does not generate an audible or noticeable alarm to the public). These silent alarm thresholds are calculated to flag "suspicious activity" at all connected VLTs/Slot Machines without inculpating innocent activity. The system maintains an audit trail throughout the process. The security software will disable/track TITO voucher serial numbers/barcodes of all TITO vouchers printed from VLTs in silent alarm mode. TITO voucher serial numbers/barcodes printed in silent alarm mode need to be redeemed at the cashier's cage and will not work in an automated redemption kiosk or Ticket Redemption Unit (TRU). TITO voucher serial numbers/barcodes printed in silent alarm mode and presented at the cashier's cage will require positive identification, and the completion of a Suspicious Activity Report (SARC) of the individual presenting the TITO voucher prior to redemption authorization.

BRIEF DESCRIPTION OF THE DRAWINGS

Additional aspects of the present invention will become evident upon reviewing the embodiments described in the specification and the claims taken in conjunction with the accompanying figures, wherein like numerals designate like elements, and wherein:

DETAILED DESCRIPTION OF THE PREFERRED EMBODIMENT

Figure 1:
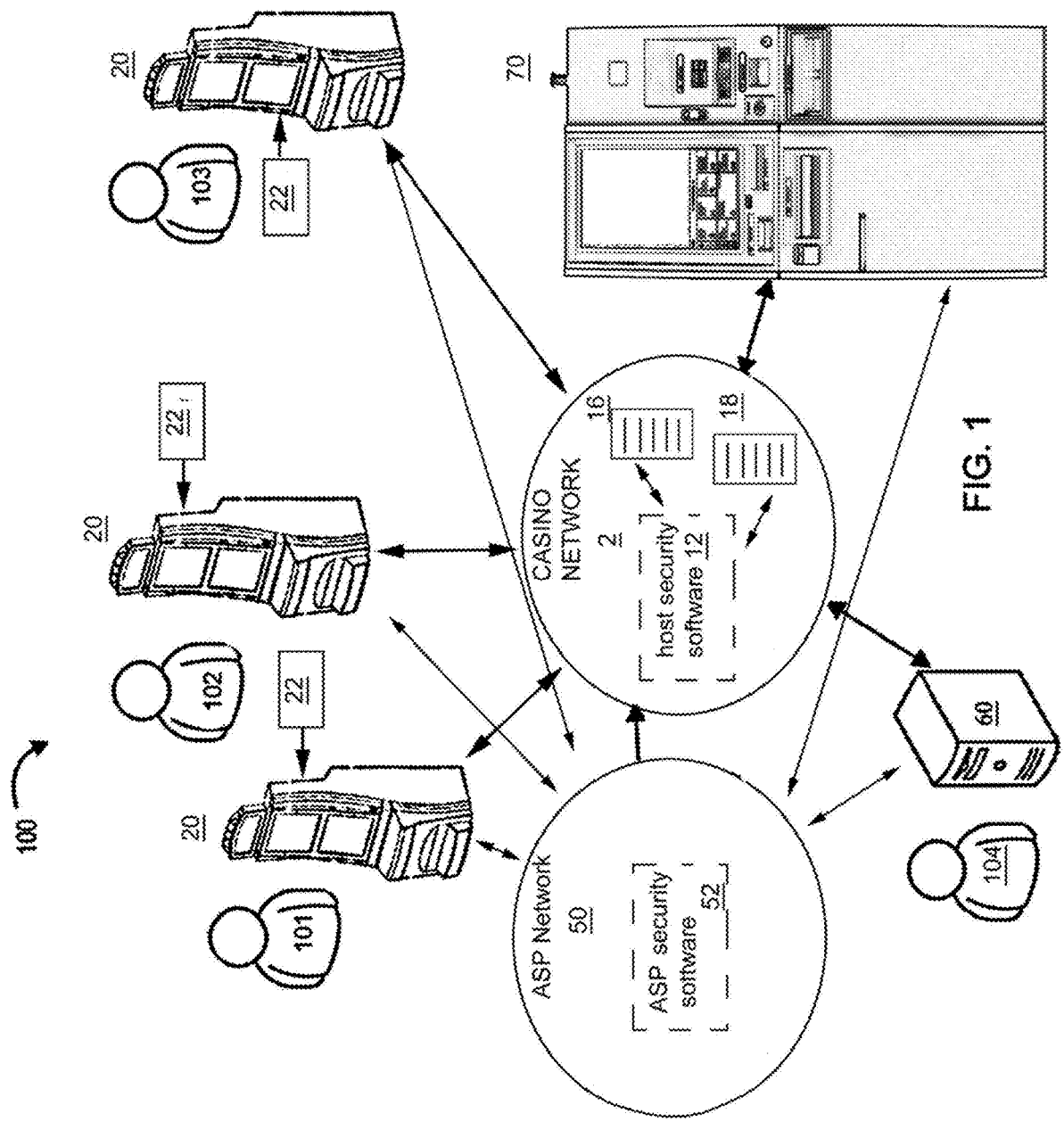
FIG. 1 is a perspective view illustrating a distributed network system.

The present invention is a system for the detection of money laundering activities involving casino slot machines and Video Lottery Terminals (collectively "VLTs/Slot Machines"). The present system is deployed over a communication network managed by a back-end Application Service Provider (ASP) system. The ASP provides Software as a Service (SaaS) to participating casinos. Each casino's VLT/Slot Machines are typically third-party devices that run third party software, but in accordance with the present invention the ASP provides VLT/client security software, e.g., a thin client front end that integrates with the third party VLT/Slot Machine software, and in turn maintains communication to the casino security network. The VLT/client security software maintains a running transaction log which includes a time-stamped record of each transaction occurring at a given terminal and a time-stamped digital image of each player responsible for those transactions. The VLT/client security software is deployed by "flash memory" cards inserted individually at each participating VLT/Slot Machine, and the VLT/client security software links all terminals to the ASP SaaS software.

For present purposes "flash memory" is herein defined as any solid-state non-volatile computer memory storage medium with an integral input/output port by which it can be electrically erased and reprogrammed.

Examples of various VLT/Slot transactions include, but are not limited to, cash in transactions; cash out transactions; wagering transactions; and Ticket-in ticket-out (TITO) transactions.

The ASP SaaS software continuously analyzes the transaction logs sent by the VLT/client security software from all connected VLT/Slot Machines in accordance with the following sequence of steps:
1. Assign a unique identifier to each captured facial image;
2. Correlate transactions occurring at a specific terminal to individual identifiers based on timestamps;
3. Correlate transactions by the same individual at different terminals based on timestamps and facial recognition (players are never identified but matching records are designated with a unique player identifier linking them to the same player);
4. deploy an artificial intelligence module in real-time to analyze each new series of transactions by a given individual, and monitor critical parameters in accordance with a declining/accumulating point system;
5. based on an individual critical-point thresholds auto-initiates a silent "alarm mode" at a particular VLT/slot terminal when certain such thresholds are exceeded.

Based on these silent alarm thresholds the ASP SaaS software flags "suspicious activity" attributable to an individual's play over time across multiple terminal yet activates the silent alarm mode at just one active VLT/slot terminal without inculpating innocent activity. If and when the ASP SaaS software detects a transaction or series of transactions that may qualify as suspicious activity it triggers silent alarm mode by sending an alarm message to the active VLT/slot terminal upon which the identified player is currently playing, as well as to the casino security network.

Upon receipt of the silent alarm message by the ASP SaaS software, the ASP SaaS software sets a flag on the TITO voucher serial numbers/barcodes of all TITO vouchers printed from the VLT/slots in silent alarm mode. The ASP SaaS software maintains a blacklist of all such designated TITO vouchers printed from VLT/slots in silent alarm mode and communicates the current list to the casino security network and to all connected automated redemption kiosk and Ticket Redemption Units. Automated redemption kiosk and Ticket Redemption Units (TRUs) are typically third-party devices that run third party software, but in accordance with the present invention that third-party software is integrated by a thin client front end with the ASP SaaS software, which in turn maintains communication to the casino security network. The TRU client application enforces the ASP/casino's transaction profiles and provides a transaction audit log to the ASP and/or casino security network's host security software. The "transaction profile" is a record that defines options and settings for conducting or completing TRU transactions or modifying the transactions or parameters related generally thereto. A transaction profile is associated with a particular type of transaction (e.g., cash out) and is populated with information to create a profile record for a particular type of transaction. A "transaction audit log" is a collection of data that collectively presents an authenticated record of information associated with a given transaction. The transaction profile for a cash-out transaction at all TRUs is programmed to deny the cash-out transaction to any blacklisted TITO voucher and instead advise the patron to present the TITO voucher to the cashier's cage for redemption. Each event is recorded in the transaction audit log as an "audit entry."

Thus, the flagged TITO voucher serial numbers/barcodes printed in silent alarm mode will have to be redeemed at the cashier's cage and will not work in any automated redemption kiosk or Ticket Redemption Units.

TITO voucher serial numbers/barcodes printed in silent alarm mode and presented at the cashier's cage will require positive identification, and the completion of a Suspicious Activity Report (SARC) of the individual presenting the ticket prior to redemption authorization.

FIG. 1 is a perspective view illustrating a distributed network system inclusive of the primary casino security network 2 running host security software 12, the ASP network 50 providing Software as a Service (SaaS) 52 to participating casinos. A plurality of VLT/Slots 20 are deployed on the casino floor for use by patrons 101-103. A corresponding plurality of flash memory cards 22 are inserted individually at each participating VLT/Slot Machine 20. The flash memory cards 22 deploy individual copies of VLT/slot client security software 24 (to be described). A plurality of TRUs 70 are also deployed on the casino floor for use by patrons 101-103, each a third-party device that runs third party software. However, that third party software is integrated to the casino security network 2 host security software 12 by a thin client front end, an is integrated to the ASP security network 50 ASP security software 52 by a thin client front end.

In the illustrated embodiment the casino security network 2 runs host security software 12 that maintains the casino's transaction profiles 16 and transaction audit logs 18, while the ASP network 50 runs ASP security software 52 responsible for flagging "suspicious activity" at any connected VLTs/Slot Machine 20. One skilled in the art should understand that the objects can be accomplished if the ASP network 50 also maintains the casino's transaction profiles 16 and transaction audit logs 18. The ASP security software 52 communicates with the VLT/Slot Machines 20 via VLT/Slot client security software 24, and with the Ticket Redemption Units 70 by a thin client front end in communication with the ASP security software 70. Similarly, the casino security network 2 communicates with the Ticket Redemption Units 70 by a thin client front end in communication with the casino host security software 12. As indicated above the "transaction profile 16 is a record that defines options, settings and parameters for conducting or completing TRU 70 transactions. In accordance with the invention, the transaction profile 16 prescribes the maximum cash-out transaction that can be completed at the TRU 70, and it flatly prohibits any cash-out transaction at any TRU 70 of any backlisted TITO voucher serial numbers/barcodes printed while a VLT/Slot Machine was in alarm mode. The transaction audit log 18 is a collection of event data associated with a given transaction. The transaction audit log 18 contains each transaction event associated with a given TITO voucher serial number/barcode including any entry indicating that the TITO voucher was printed in alarm mode. In addition, cage cashiers are employed at the cage and man client cage computers 60 also in communication with the casino security network 2. Cage cashiers are responsible for exchanging cash for casino chips/tokens, and vice versa.

Figure 2:
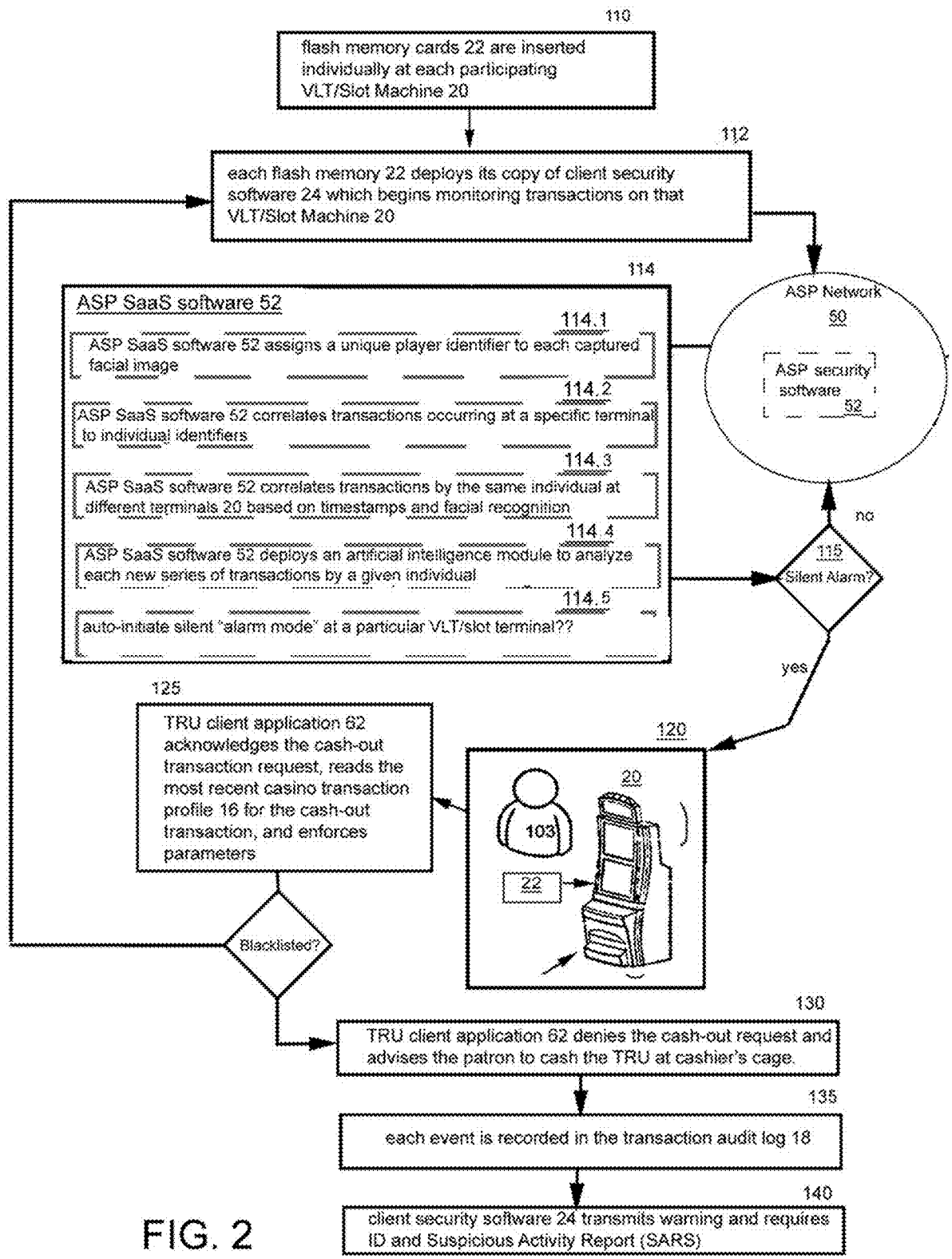
FIG. 2 is a block diagram illustrating the stepwise sequence of operation of the present process.

FIG. 2 is a block diagram illustrating the stepwise sequence of operation of the present process.

At step 110 flash memory cards 22 are inserted individually at each participating VLT/Slot Machine 20.

At step 112 each flash memory card 22 deploys its copy of ASP client security software 22 which begins monitoring transactions on that VLT/Slot Machine 20, including cash in transactions among others. The ASP client security software 22 continuously updates a record of transactions at ASP network 50 for each VLT/Slot Machine 20, including transactions occurring at each specific terminal, transaction timestamps, digital images of each player at that terminal, and image timestamps.

At step 114 the ASP SaaS software 52 continuously analyzes the transaction logs sent by the VLT/client security software 22 from all connected VLT/Slot Machines 20 in accordance with the following sequence of sub steps:

at sub step 114.1 the ASP SaaS software 52 assigns a unique player identifier to each captured facial image;

at sub step 114.2 ASP SaaS software 52 correlates transactions occurring at a specific terminal 20 to individual identifiers based on timestamps;

at sub step 114.3 ASP SaaS software 52 correlates transactions by the same individual at different terminals 20 based on timestamps and facial recognition (players are never identified but matching records are designated with a unique player identifier linking them to the same player);

at sub step 114.4 ASP SaaS software 52 deploys an artificial intelligence module in real-time to analyze each new series of transactions by a given individual, and to monitor critical parameters in accordance with a declining/accumulating point system. Points are awarded based on elapsed time between the cash-in and cash-out transactions (playing time), the net difference between cash-in amount and cash-out amount (win/loss value), and the number of bets placed. Thus, in an embodiment, for example, five points are awarded for any initial cash-in value in excess of $5000. Ten points are awarded for any initial cash-in value in excess of $10,000. One point is awarded for each block of playing time in excess of five minutes, and one point is subtracted for playing time less than five minutes contingent on win/loss value equal to the initial bet placed. This way, points awarded for high cash-in values and/or quick playing times are reduced if the difference between cash-in amount and cash-out amount indicates that all the money was lost. In addition, points are reduced for longer playing times. The point system allows flagging of suspicious activity, e.g., a patron who after inserting $1000 cash played for only three minutes with minimal gaming then requested a TITO voucher, but reduces the chance of innocent gambling behavior being flagged as suspicious.

At sub step 114.5, based on an individual critical-point threshold, ASP SaaS software 52 auto-initiates a silent alarm mode at a particular VLT/slot terminal 20 when certain such thresholds are exceeded.

At step 115 alarm mode is initiated at a particular VLT/slot terminal 20. When a cash-out transaction is commenced, the VLT/Slot client security software 24 prints a TITO voucher serial number/barcode indicating that the TITO voucher was printed in alarm mode The VLT/Slot client security software 24 transmits the TITO voucher serial number/barcode to the casino security network 2 where it is appended to the record of blacklisted TITO voucher serial numbers/barcodes of cash-out transaction profile 16. The number of the VLT/Slot 20 that flagged the transmitted TITO voucher, as well as the TITO voucher serial number/barcode, time and date, and other salient event facts are appended to audit log 18.

Next the patron takes the printed TITO voucher to any Ticket Redemption Unit 70 and attempts a redemption or "cash-out transaction."

At step 125 the TRU client application 62 acknowledges the cash-out transaction request, reads the most recent casino transaction profile 16 for the cash-out transaction, and enforces its parameters including comparing the blacklisted register of TITO voucher serial numbers/barcodes printed while a VLT/Slot Machine was in silent alarm mode.

At step 130 if the transaction profile 16 for a cash-out transaction is blacklisted the TRU client application 62 denies the cash-out request and instead advises the patron to present the TITO voucher to the cashier's cage for redemption. The fifth flag TITO voucher serial numbers/barcodes printed in "alarm mode" will have to be redeemed at the cashier's cage and will not work in any Ticket Redemption Units.

At step 135 each event is recorded in the transaction audit log 18 as an "audit entry."

At step 140 the client security software 24 transmits a warning to the cashier cage 60 indicating that a patron possessing a fifth flag TITO voucher serial number/barcode printed in alarm mode will be approaching for redemption. The TRU 70 also displays a message to the cashier 104 warning them of the upcoming cash-out transaction and instructing them to require positive identification and the completion of a Suspicious Activity Report (SARC) of the individual presenting the TITO voucher prior to redemption authorization. Any failure of the individual to give information for the SARC would result in the automatic refusal for payment on the TITO voucher. If no identification is presented within 180 days (or governing body's specified redemption period), then the funds on the TITO voucher would be remitted to the governing body (or process set forth by the governing body).

Having now fully set forth the preferred embodiment and certain modifications of the concept underlying the present invention, various other embodiments as well as certain variations and modifications of the embodiments shown and described will obviously occur to those skilled in the art upon becoming familiar with the concept. It is to be understood, therefore, that the invention may be practiced other than as specifically set forth herein.

We claim:

1. A system for the detection of money laundering activities within a casino environment including a host casino computer network, a cashier client station running cashier client software in communication with said host casino computer network, and a plurality of gambling terminals each running Video Lottery Terminal (VLT) client software in communication with said host casino computer network, the system comprising:
   an application service provider (ASP) running ASP security software, said ASP maintaining a database comprising a plurality of predetermined transaction types each associated with a predetermined transaction profile associated with that transaction type; and
   a plurality of flash memory cards each configured for insertion in a corresponding gambling terminal and each containing security software comprising executable program code for carrying out the steps of,
      identifying a transaction on one of said gambling terminals by predetermined transaction type;
      applying a predetermined ruleset configured for determining whether the transaction on one of said gambling terminals complies with the transaction profile associated with the identified transaction type, and determining that the transaction does not comply;
      setting a flag indicating suspicious activity;
      printing a voucher having a unique identifier, and transmitting that unique identifier to said host casino network security software;
      whereby said host casino network security software prevents cash-out transactions to said voucher based on said identifier and transmits an alert to said cashier client stations to require positive identification and complete a suspicious activity report (SARC).

2. The system of claim 1, wherein said security software carries out the additional steps of,
   capturing a plurality of facial images; and
   assigning a unique identifier based on each captured facial image.

3. The system of claim 1, wherein said security software carries out the additional steps of,
   assigning timestamps to transactions occurring at each of said plurality of gambling terminals.

4. The system of claim 3, wherein said security software carries out the additional steps of,
   associating assigned timestamps to said identifiers assigned to captured facial images.

5. The system of claim 1, wherein said printed voucher cannot be redeemed in automated redemption kiosks and must be taken to a cashier's cage.

6. The system of claim 1, wherein said security software transits a silent alarm to the casino network.

7. A system for the detection of money laundering activities within a casino environment including a host casino computer network, a cashier client station running cashier client software in communication with said host casino computer network, and a plurality of gambling terminals each running Video Lottery Terminal (VLT) client software in communication with said host casino computer network, the system comprising:
   an application service provider (ASP) running ASP security software; and
   a plurality of flash memory cards each configured for insertion in a corresponding gambling terminal and each containing security software comprising executable program code for carrying out the steps of,
      identifying a transaction on one of said gambling terminals by predetermined transaction type;
      monitoring said transaction on said gambling terminal;
      applying a predetermined ruleset configured for determining whether the monitored transaction complies with a transaction profile associated with the identified transaction type, and determining that the transaction does not comply;
      setting a flag indicating suspicious activity; and
      printing a voucher having a unique identifier, and transmitting that unique identifier to said host casino network security software;
      whereby said host casino network security software prevents cash-out transactions to said voucher based on said identifier and transmits an alert to said cashier client stations to require positive identification and complete a suspicious activity report (SARC).

8. The system of claim 7, wherein said security software carries out the additional steps of,
   capturing a plurality of facial images; and
   assigning a unique identifier based on each captured facial image.

9. The system of claim 7, wherein said security software carries out the additional steps of,
   assigning timestamps to transactions occurring at each of said plurality of gambling terminals.

10. The system of claim 9, wherein said security software carries out the additional steps of,
    associating assigned timestamps to said identifiers assigned to captured facial images.

11. The system of claim 7, wherein said printed voucher cannot be redeemed in automated redemption kiosks and must be taken to a cashier's cage.

12. The system of claim 7, wherein said security software transits a silent alarm to the casino network.

13. A system for the detection of money laundering activities involving casino slot machines and video lottery terminals, comprising:
    a host casino network running security software;
    an application service provider (ASP) running ASP security software;
    a plurality of slot machines and/or video lottery terminals each running slot/VLT (Video Lottery Terminal) client software in communication with said ASP host casino security software;
    a cashier's client station running software in communication with said ASP security software and said host casino network security software;
    a plurality of flash memory cards, each configured for insertion in a corresponding slot machine or video lottery terminal and each containing security software comprising executable program code for carrying out the step of applying a predetermined ruleset and determining whether a transaction is in compliance with a transaction profile associated with that transaction type, and when not in compliance setting a flag indicating suspicious activity, printing a Ticket in Ticket Out (TITO) voucher having a serial number/barcode, and transmitting that TITO voucher serial number/barcode to said host casino network security software, whereby said host casino network security software thereupon prevents cash-out transactions to said TITO voucher serial number/barcode and transmits an alert to cashiers to require positive identification and complete a Suspicious Activity Report (SARC).

\* \* \* \* \*